(12) United States Patent
Kashyap

(10) Patent No.: US 6,284,437 B1
(45) Date of Patent: *Sep. 4, 2001

(54) METHOD AND DEVICE FOR RECORDING A REFRACTIVE INDEX PATTERN IN AN OPTICAL MEDIUM

(75) Inventor: Raman Kashyap, Ipswich (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,122
(22) PCT Filed: Jan. 16, 1997
(86) PCT No.: PCT/GB97/00125
§ 371 Date: Apr. 1, 1998
§ 102(e) Date: Apr. 1, 1998
(87) PCT Pub. No.: WO97/26570
PCT Pub. Date: Jul. 24, 1997

(30) Foreign Application Priority Data

Jan. 16, 1996 (EP) .................................................. 96300295
Mar. 29, 1996 (GB) .................................................. 9606781

(51) Int. Cl.⁷ .................................................. G02B 6/16
(52) U.S. Cl. .................. 430/321; 430/397; 385/37; 359/34; 355/48; 355/50
(58) Field of Search .................. 355/48, 50; 385/37; 430/321, 945, 397; 359/34

(56) References Cited

U.S. PATENT DOCUMENTS

| | | | |
|---|---|---|---|
| 3,712,735 | * 1/1973 | Crumley et al. | 355/85 |
| 4,101,373 | * 7/1978 | Schiffman | 355/50 |
| 4,136,947 | 1/1979 | Harper et al. | 355/50 |
| 4,294,782 | * 10/1981 | Froehlig | 264/1.6 |
| 4,888,266 | * 12/1989 | Lacotte et al. | 430/321 |
| 5,066,133 | 11/1991 | Brienza | 359/570 |
| 5,104,209 | * 4/1992 | Hill et al. | 385/37 |
| 5,289,231 | * 2/1994 | Magome et al. | 355/50 |
| 5,367,588 | * 11/1994 | Hill et al. | 385/37 |
| 5,434,424 | * 7/1995 | Stickel et al. | 355/50 |
| 5,655,040 | * 8/1997 | Chesnoy et al. | 385/37 |

FOREIGN PATENT DOCUMENTS

| | | | |
|---|---|---|---|
| 668 514 | 8/1995 | (EP) . | |
| 7-151910 | * 6/1995 | (JP) . | |
| WO 93/04396 | 3/1993 | (WO) . | |
| 94/18609 | * 8/1994 | (WO) | 430/2 |
| 95/22068 | * 8/1995 | (WO) . | |

OTHER PUBLICATIONS

Kashyap et al. "Novel method of producing all fibre photoinduced chirped gratings" Electron. Lett., vol. 30(12) pp. 996–998, Jun. 1994.*

Byron et al., Fabriction of chirped fibre gratings by novel stretch and write techniques Electron. Lett., vol. 31(1) pp. 60–61, Jan. 1995.*

Rizvi et al., Excimer laser writing of submicrometre period fibre Bragg gratings using phase shifting mask projection Electron. Lett., vol. 31(11) pp. 901–902, May 1995.*

(List continued on next page.)

Primary Examiner—Martin Angebranndt
(74) Attorney, Agent, or Firm—Nixon & Vanderhey P.C.

(57) ABSTRACT

A device for recording a refractive index pattern in a photosensitive optical fiber includes a rotary disc formed with a phase mask in a circular pattern, which is rotated by an axis. The phase mask is illuminated with laser light in a region so that a moving interference pattern is formed. The optical fiber is moved along a path in synchronism with the moving interference pattern so that the pattern becomes recorded in the fiber. The pattern can be formed continuously over long fiber lengths, e.g., of the order of one meter.

31 Claims, 5 Drawing Sheets

OTHER PUBLICATIONS

Martin et al., "Novel writing technique of long and highly reflective in–fibre gratings" Electron., Lett., vol. 30(10) pp. 811–812, May 1994.*

Kodake, et al., "Fabrication of Efficient Phase Gratings using Deep UV Ltihography", Opt. and Quantum Electron., vol. 14(1), pp. 85–88, Jan. 1982.*

Electronics Letters, vol. 30, No. 16, Aug. 4, 1994, pp. 1341/1342, Rourke et al, "Fabrication and Characterisation of Long, Narrowband Fibre Gratings by Phase Mask Scanning".

Electronics Letters, vol. 31, No. 17, Aug. 17, 1995, pp. 1488–1490, Cole et al, Moving fibre/pahse mask–scanning beam technique for enhanced flexibility in producing fibre gratings with uniform phase mask.

Electronics Letters, vol. 31, No. 17, Aug. 17, 1995, pp. 1483–1485, Loh et al, "Compensation of imperfect phase mask with moving fibre–scanning beam technique for production of fibre gratings".

Translation of JP 07–151910.

* cited by examiner

METHOD AND DEVICE FOR RECORDING A REFRACTIVE INDEX PATTERN IN AN OPTICAL MEDIUM

BACKGROUND OF THE INVENTION

1. Field of the Invention

This invention relates to a device and method for recording a refractive index pattern in an optical medium and has particular application to forming a refractive index grating in an optical waveguide such as an optical fibre.

2. Related Art

It is known that the refractive index of an optical fibre can be altered by exposing it to high intensity light. Germanium doped fibre exhibits photosensitivity in this manner, particularly in response to ultraviolet (u.v.) radiation, and the effect can be used to form a so-called refractive index grating in the fibre. Reference is directed to K. O. Hill et al, "Photosensitivity in Optical Waveguides: Application to Reflection Filter Fabrication" Applied Physics Letters Vol. 32, No. 10 647 (1978). The grating can be formed by producing an optical interference pattern with two interfering beams, and exposing the optical fibre to the interference pattern, so as to record the pattern in the fibre. The interference pattern can be formed by directing an optical beam longitudinally through the fibre and reflecting it back along its path through the fibre, so as to produce a standing wave pattern, which becomes recorded in the fibre due to its photosensitivity. This method is difficult to control in practice and there is a limit on the length of fibre that can be exposed in this way.

In an alternative method, beams derived from a coherent source such as a laser are directed transversely of the length of the fibre, so as to interfere with one another and produce an interference pattern externally of the fibre, which becomes recorded in the fibre as a result of its photosensitivity. A block for producing an external interference pattern for this purpose is described in EP-A-0 523 084.

Another way of forming the grating is to use a phase mask in which the desired amplitude pattern has been recorded holographically as a mask pattern. The phase mask is placed adjacent to the fibre and illuminated with laser light so as to expose the fibre to the holographic pattern. Reference is directed to K. O. Hill et al "Bragg Grating Fabricated in Monomode Photosensitive Fibre by u.v. Exposure through a Phase Mask" Applied Physics Letters Vol. 62 No. 10, 1035 (1993), and also to R. Kashyap et al "Light-sensitive optical fibres and planar waveguides", BT Technol. J. Vol 11, No. 2 (1993).

For a general review of refractive index gratings, reference is directed to "Photosensitive Optical Fibres: Devices and Applications" R. Kashyap, Optical Fibre Technology 1, 17–34 (1994).

A problem with the prior techniques is that there is a limit to the length of refractive index grating that can be formed. With the technique described in EP-A-0 523 084, the length of fibre that can be exposed at any one time to the grating pattern, is limited by the width of the block that produces the external interference pattern and the coherence of the beam, and is typically of the order of 1 cm. When a phase mask is used, the holographic pattern is limited primarily by the length of the phase mask and the width of the beam of coherent light used to illuminate the mask. In practice, the width is limited to the order of 1 cm, although longer gratings have been attempted by a repetitive scanning technique as described by J. Martin et al "Novel Writing Technique of Long Highly Reflective in Fibre Gratings and Investigation of the linearly Chirped Component" Proc. Conference on Optical Fibre Communications, OFC '94 post deadline paper PD29-1, 138, 1994.

Refractive index gratings, which operate as Bragg gratings, have many applications in optical data communications systems, as discussed by Kashyap supra, and in particular, may be used as wavelength filters. The bandwidth of the filter is a function of the length of the grating along the fibre and it is therefore desirable to be able to form gratings of extended length. Hitherto, this has proved difficult.

SUMMARY OF THE INVENTION

The present invention provides an alternative way of recording a refractive index pattern in an optical medium, which permits much longer gratings to be formed.

In accordance with the invention from a first aspect there is provided a device for recording a refractive index pattern in an optical medium that has a photosensitive refractive index, comprising means for producing a moving optical intensity pattern, and means for feeding an optical medium along a path past the pattern producing means during production of the moving pattern so as to record the pattern in the medium.

The pattern producing means may include means disposed in a loop for forming the pattern, and the feeding means may be operative to feed the optical medium along the path during circulation of the loop so as to record the pattern longitudinally in the optical medium.

The invention has particular application to recording refractive index gratings in optical waveguides such as optical fibres.

The pattern producing means may include a phase mask arranged in a closed loop so that upon rotation of the loop, the pattern is recorded repetitively. For optical fibres, the pattern may be recorded longitudinally along the length of the fibre so as to form a grating of extended length, for example of the order of one meter or longer.

The phase mask may be formed on a rotary disc. Alternatively, the phase mask may be recorded on the surface of a cylindrical member, so arranged that radiation can be directed from within so as to form the optical pattern exteriorly.

The rotary member may be made of silica and the phase mask may comprise spatially periodic undulations formed in a surface of the member.

The invention also includes a method of recording a refractive index pattern in an optical medium that includes an elongate path for optical radiation with a photosensitive refractive index, the method comprising using a device to produce an optical intensity pattern such that it is recorded a plurality of times along the length of the path in the optical medium.

The invention further includes a method of recording a refractive index pattern in an optical medium that includes an elongate path for optical radiation with a photosensitive refractive index, the method comprising sequentially recording substantially contiguous optical intensity component patterns along the length of the path in the optical medium such as to form an elongate resultant pattern from said components.

In another aspect, the invention provides a device for recording a refractive index pattern in an optical medium that has a photosensitive refractive index, comprising means arranged in a loop for producing an optical intensity pattern, and means for exposing the medium to the pattern so as to record it linearly in the medium.

Thus, in accordance with the invention, patterns of extended length may be recorded in the medium.

BRIEF DESCRIPTION OF THE DRAWINGS

In order that the invention may be more fully understood, embodiments thereof will now be described by way of example with reference to the accompanying drawings in which.

DETAILED DESCRIPTION OF EXEMPLARY EMBODIMENTS

Figure 1:
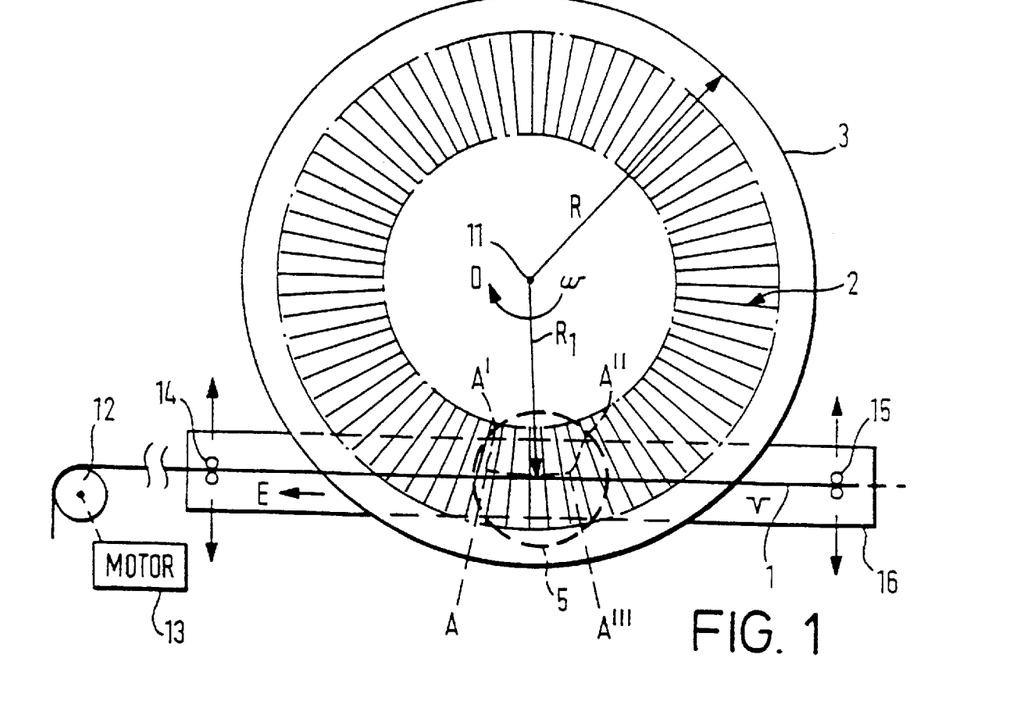
FIG. 1 is a schematic plan view of a first device for recording a refractive index pattern in an optical fibre.
Figure 2:
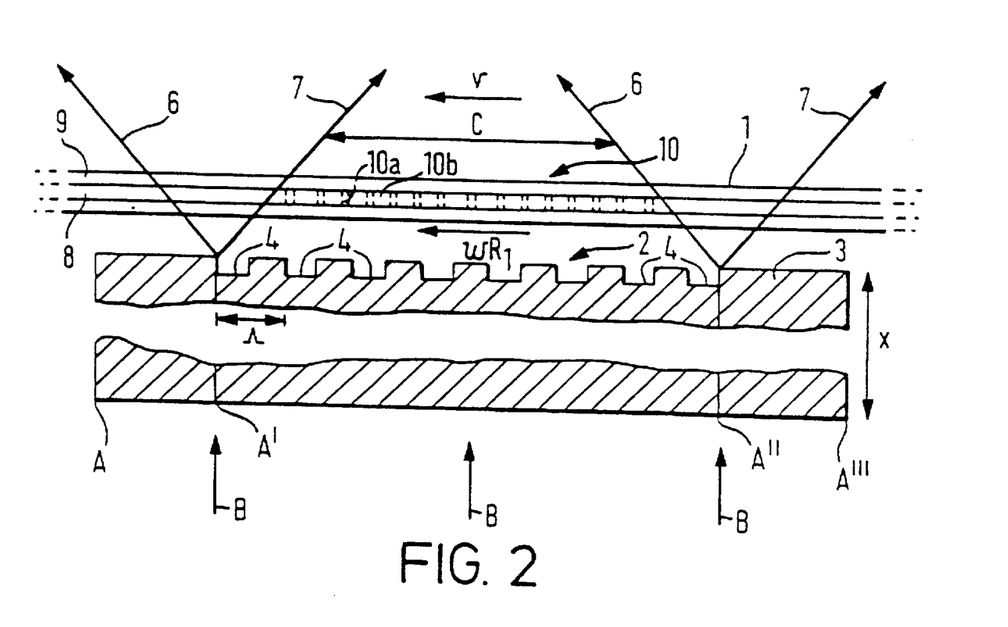
FIG. 2 is an enlarged sectional view taken along the line A–A'–A"–A'" shown in FIG. 1.

Referring firstly to FIG. 1, an optical refractive index grating is recorded in a photosensitive optical fibre 1 by means of an optical interference pattern that is produced by the use of a phase mask 2 recorded in a rotary disc 3. FIG. 2 shows a section through the disc along the line A–A'–A"–A'" of FIG. 1. In FIG. 2, the phase mask can be seen more clearly, and consists of a series of radially extending grooves 4 cut in the surface of the disc so as to act as a diffraction grating. The disc is illuminated with coherent light from a laser at a fixed location, operating at a u.v. wavelength e.g. 244 nm, as illustrated by arrows B. The lateral extent of illumination is illustrated schematically in FIG. 1 by circle 5 shown in dotted outline. The disc 3 is made of material that is transparent to the u.v. light from the laser and conveniently is formed of fused silica with a refractive index n=1.46. In a typical example, the disc has a radius R of 40 mm and a thickness x=3 mm. The groves 4 may be formed by techniques which are conventional per se, such as E-beam lithography and selective etching, or by photolithography using a mask followed by selective etching. For further details of these conventional techniques, reference is directed to C. Dix and P. F. McKee, J. Vac. Science Technology Vol 10, No. 6 pp 266–267 (1992). A typical depth of the grooves 4 is 0.26 $\mu$m with the spatial periodicity $\Lambda$ of the pattern shown in FIG. 2 being of the order of 1 $\mu$m.

The laser light incident on the disc 3 in direction B is diffracted by the phase mask pattern 2 so as to form first and second diffracted beams 6, 7, which overlap and form a diffraction pattern in region C. The optical fibre 1 extends through the region of the diffraction pattern. The optical fibre consists of a core 8 surrounded by a cladding 9 which has a lower refractive index than the core. The fibre is typically a silica fibre and has a photosensitive core which may be co-doped with Ge and B. The core is photosensitive to the u.v. light from the laser at wavelength 244 nm. As a result, the refractive index pattern becomes recorded in the core 8 of the fibre 1 in a manner well known per se, so as to form a refractive pattern shown in dotted outline in FIG. 2, consisting of a series of regions of relatively high and low refractive index 10$a$, 10$b$ along the length of the exposed region of the fibre. Reference is directed to G. Meltz et al "Formation of Bragg Gratings and Optical Fibres by Transverse Holographic Method" Opt. Lett. Vol. 14; No. 15 823 (1989) for a general discussion of recording the refractive index pattern in the grating. The diameter of the core 8 of the fibre may be of the order of 8 $\mu$m and the exterior diameter of the cladding 9 may be of the order of 125 $\mu$m. The length of the fibre C that is exposed to the interference pattern, may be of the order of 1 mm.

The present invention permits the refractive index grating to be written in much longer lengths of the fibre than the region C. Referring to FIG. 1, the disc 3 is mounted for rotation about a central axis 11 in the direction of arrow D, and is driven by a motor (not shown). The phase mask 2 is arranged in a circular, continuous loop, which is concentric with the axis 11 of rotation of the disc 3. Thus, as the disc is rotated, it passes through the fixed region of illumination 5 produced by the laser and as a result, a moving interference pattern is formed within the region 5, the pattern rotating at the same rate as the disc 3.

The optical fibre 1 is driven through the region 5 so as to be in synchronism with the rotating interference pattern. To this end, the optical fibre is pulled by a pulley 12 driven by a motor 13 through guide rollers 14, 15, mounted on a common support 16. The fibre 1 subtends a radius $R_1$ with respect to the axis 11 of the disc 3. In order to achieve synchronism of the rotating interference pattern and the moving fibre 1, the following condition needs to be satisfied:

$$\omega R_1 = v$$

where v is the speed on movement of the fibre 1 in direction E and $\omega$ is the rate of rotation of the disc 3.

The speed v of the fibre and the rate of rotation $\omega$ of the disc are selected to provide an adequate exposure time of the fibre to the interference pattern Region C in order to achieve satisfactory recording of the pattern in the fibre core 8. In one example, the fibre speed v was selected to produce a fibre exposure time of the order of several minutes per mm.

Figure 3:
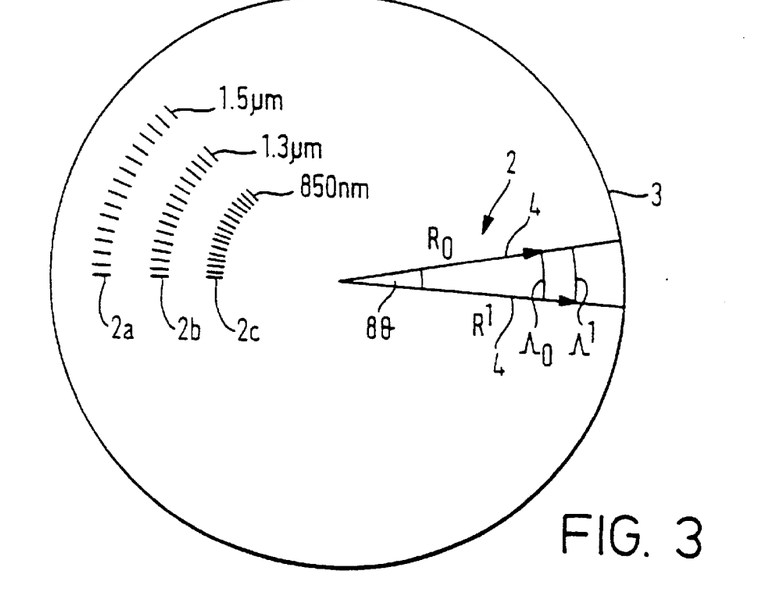
FIG. 3 is a schematic diagram of the disc shown in FIG. 1, for explaining the radial disposition of the phase mask recorded on the disc.

The spatial periodicity of the pattern recorded in the fibre can be adjusted by moving the support 16 shown in FIG. 1 radially inwardly or outwardly of the disc. This will now be explained in more detail with reference to FIG. 3 which shows two radial grooves 4 of the phase mask 2 on an expanded scale, spaced apart by a small angle $\delta\theta$. For a particular radius $R_0$ the spatial periodicity of the pattern $\Lambda_0$ is given by:

$$R_0 \delta\theta = \Lambda_0$$

Similarly, for a slightly larger radius R', the spatial periodicity $\Lambda'$ is given by:

$$R'\delta\theta = \Lambda'$$

Thus, it can be shown that $\Lambda'=(R'/R_0)\Lambda_0$

Accordingly, the spatial periodicity $\Lambda'$ of the pattern can be selected by moving radially inwardly or outwardly of the disc 3. In the embodiment of FIG. 1, this is achieved by means of the movable support 16 which permits the fibre 1 to be shifted inwardly or outwardly so as to select the desired spatial periodicity of the phase mask and hence the pattern recorded in the fibre. This can be used for fine tuning the pattern recorded in the fibre or, by moving over larger distances to select the periodicity itself. Referring to FIG. 3, three bands of the radial phase mask pattern 2 are shown, referenced 2a, b and c, for recording refractive index gratings in the region of 1.5 $\mu$m, 1.3 $\mu$m and 0.85 $\mu$m respectively. The corresponding value of $\Lambda$ for the mask pattern was 1.066 $\mu$m, 0.904 $\mu$m and 0.579 $\mu$m respectively.

Figure 4:
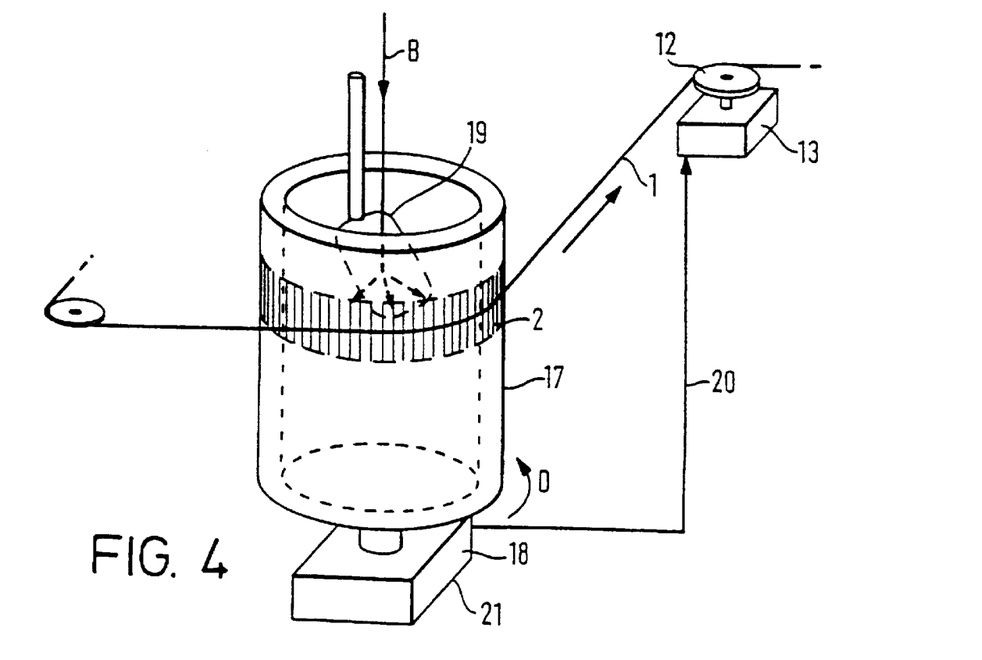
FIG. 4 is a schematic illustration of a second embodiment according to the invention.

FIG. 4 illustrates an alternative embodiment in which the phase mask 2 is recorded on the exterior surface of a hollow cylindrical body 17 which is rotated in the direction of arrow D by motor 18. The body 17 is transparent to the u.v. illuminating light from the laser (not shown), which is directed on path B onto a mirror 19 within the body 17, so as to be reflected through the body to the exterior thereof, so that the phase mask pattern is formed radially outwardly of the cylindrical body 17.

The fibre 1 is driven along a path in contact with the exterior surface of the body 17 so that the interference pattern is recorded in the fibre. As in FIG. 1, the fibre is pulled by pulley 12 driven by motor 13. The speed of motor 13 may be controlled over electrical line 20 by control means 21 associated with the motor 18 in order to maintain synchronism of the rotating interference pattern produced by the phase mask, and the drive speed for the fibre 1. The arrangement of FIG. 4 has the advantage that the fibre may be exposed for a longer period of time than in the arrangement of FIG. 1 due to the fact that it is maintained at a constant radius relative to the axis of rotation of the body 17.

Many variations and modifications to the above described devices are possible. For example, in the embodiment of FIG. 4, the cylindrical body can be solid, and the laser beam can be directed obliquely through its upper surface, to avoid use of the mirror 19. Also, the cylindrical body may be conical so that by moving the fibre drive arrangements upwardly and downwardly, the spatial periodicity of the pattern can be altered and wavelength tuned. Also, for the embodiment of FIG. 4, by tensioning the fibre, fine tuning of the recorded pattern periodicity can be achieved. The fibre can be wrapped more than once around the cylindrical body.

Also, for both of the described embodiments, changes in the recorded pattern can be achieved along the length of the recorded pattern, for example by introducing small changes in the relative speed of the fibre v and the rate of rotation $\omega$ of the phase mask pattern 2. This process can be used to introduce a chirp in the recorded pattern. Also, the phase mask pattern may be configured to produce a blazed grating in the fibre.

Figure 5:
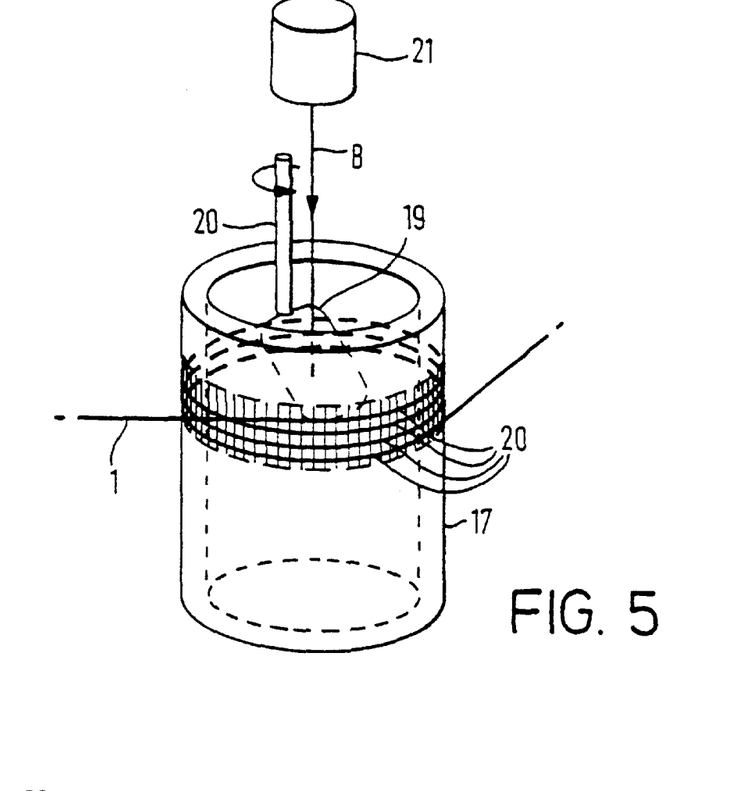
FIG. 5 is a schematic illustration of a third embodiment according to the invention.

Another embodiment will now be described with reference to FIG. 5, which can be considered as a modification of FIG. 4. In this arrangement, the cylinlrical body 17, with the phase mask pattern 2, is stationary, and the fibre 1 is wrapped in a plurality of turns 20 around the circular phase mask. The mirror 19 is mounted on a rotary shaft 20 driven by a motor (not shown) so that light beam B from laser 21, is scanned in a circular path around the pattern. Thus, if the pattern around the drum is considered as a component pattern, the component pattern is recorded a plurality of times in respective turns of the fibre around the drum, in a contiguous relationship. In this way the refractive index grating is recorded as a continuous pattern a plurality of times in the turns 20 of the fibre 1 wrapped around the cylindrical body 17.

Figure 6:
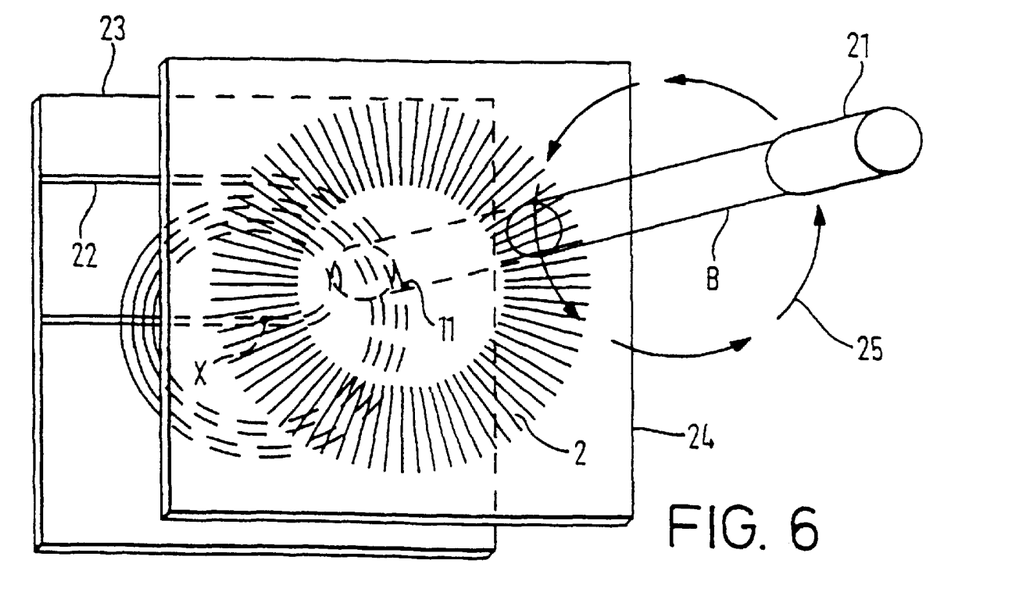
FIG. 6 is a schematic illustration of a fourth embodiment according to the invention.

Referring now to FIG. 6, a fourth embodiment of the invention is shown, in which a chirped refractive index grating is recorded in a spiral planar waveguide 22 which is formed in the surface of a silica plate 23, in a manner well known per se. For example, the silica plate 23 may be provided with a photosensitive surface coating by Ge:B co-doping techniques, which is then photo etched to form the spiral pattern. It will be seen that the waveguide 22 is arranged generally concentric with point X.

The plate 23 is overlaid by a phase mask 2 recorded in a glass plate 24. The phase mask is formed in the same way as the mask 2 shown in FIGS. 1 and 2. However, the plate 24 does not rotate. The centre 11 of the pattern 2 is arranged coaxially with the centre X of the spiral waveguide pattern on plate 23. The laser 21 is mounted on means (not shown) so as to move in a circular path 25 concentric with the circular pattern 2 of the phase mask. The beam B from the laser illuminates the phase mask and accordingly records the refractive index pattern from it in the spiral waveguide 22. Alternatively, the u.v. beam B may be fixed and the assembly of the waveguide 22 and the phase mask may be correspondingly moved to achieve the scanning.

In view of the radially outwardly extending ridges in the pattern 2, the periodic spacing of the pattern recorded in the spiral waveguide 22 is smaller in the radially innermost turns of the spiral pattern and increases progressively in the outer turns. Consequently, the pattern is imparted with a chirp. Thus, the fourth embodiment permits the recording of a chirped filter that can be used for optical telecommunications purposes, for example to recover the effects of dispersion along a long length of optical fibre.

Modifications of the embodiment of FIG. 6 include the use of an optical fibre arranged in a spiral pattern or in a coil, instead of the planar waveguide shown.

Figure 7:
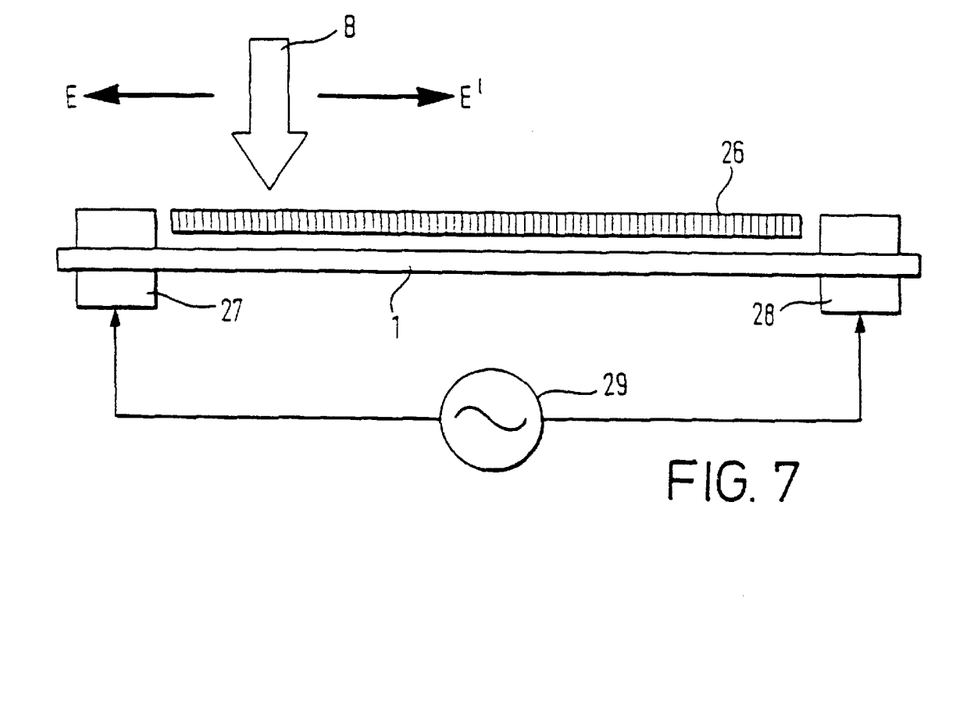
FIG. 7 is a schematic illustration of a fifth embodiment according to the invention.

A fifth embodiment of the invention is shown in FIG. 7, in which a planar phase mask 26 is used, aligned with a length of an optical fibre 1. In order to record the grating in the waveguide, the beam B of the laser 21 is scanned longitudinally of the length of the phase mask 26, in the direction of arrows E–E'. The fibre is held at each end of the phase mask by means of clamps 27, 28 that include piezo electric elements that may be driven by an electrical oscillating source 29, which causes the fibre to be stretched and relaxed longitudinally in an oscillatory manner, which is relatively rapid compared to the rate of scanning of the beam B. The cyclic stretching and relaxing of the fibre 1 results in apodisation of the recorded pattern and for further details, reference is directed to our PCT/GB96/03079 filed on Dec. 12, 1996.

The apparatus shown in FIG. 7 can be used to record a series of component refractive index grating patterns which are substantially contiguous, along the length of the fibre 1. Thus, when the first grating pattern has been recorded as just described, the clamps 27, 28 are released and the fibre is slid longitudinally between the clamps by an amount corresponding to the length of the phase mask 26. The clamps are then tightened again and the recording process is repeated so as to form a second grating pattern substantially contiguous with the first pattern. The process may be repeated many times in order to form a resultant pattern of sufficient length. The apodisation performed by means of the clamps 27, 28 and the oscillator 29 need not be performed on the recorded pattern components between the end components of the resultant, long grating. Apodisation need only be applied at the ends of the resultant recorded pattern. This can be achieved by stretching the fibre in an oscillatory manner with only one of the piezo devices, i.e. from one end only, for each end pattern. The contiguous junctions between adjacent pattern components recorded in the fibre may be trimmed using u.v. light in order to achieve a phase coherence of the pattern components, the u.v. trimming being carried out as described in our PCT/GB94/00180 filed on Jan. 31, 1994.

Thus, it will be understood that the process can be repeated on the same fibre at different, substantially contiguous locations with the same phase mask to produce a long grating, in which case apodisation by stretching will be applied asymmetrically at the ends of the long pattern. Alternatively, phase masks with different spatial periodicities can be used to produce a chirped pattern. The recorded patterns can be matched at their junctions by the apodisation process or, no apodisation may be applied to march the junctions.

Figure 8:
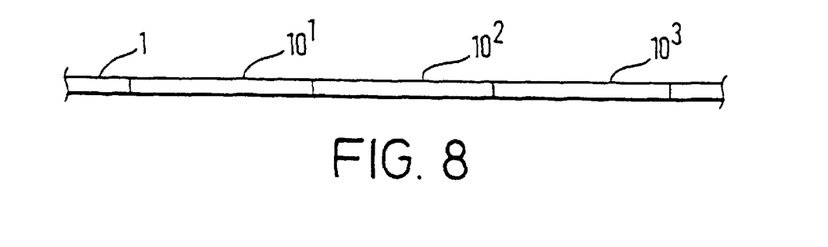
FIG. 8 is an illustration of a fibre including a refractive index grating formed in accordance with the fifth embodiment.

A resultant, recorded pattern is shown in an optical fibre in FIG. 8. The pattern consists of a series of component patterns $10^1, 10^2, 10^3$ recorded in a contiguous manner along the length of the fibre 1. No apodisarion is applied by stretching at the joins between the patterns 10 in this example. The optical fibre may be of the same dimensions and photosensitive characteristics as described in relation to FIG. 1. Surprisingly, the contiguous, recorded patterns do not necessarily require apodisation at their junctions in order to achieve satisfactory matching.

Figure 9:
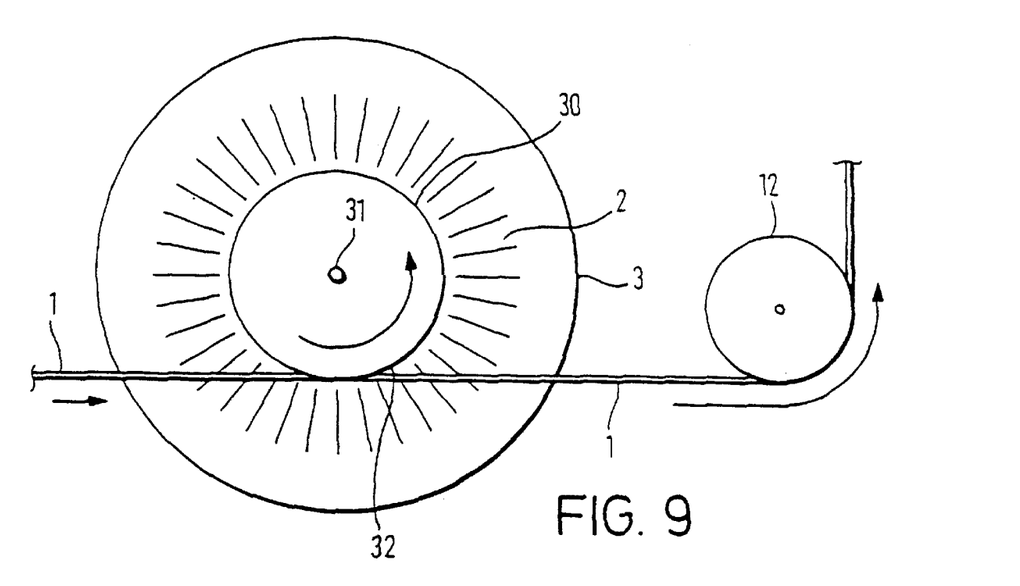
FIG. 9 is an schematic plan view of another device for recording a refractive index grating in an optical fibre, in accordance with the invention.
Figure 10:
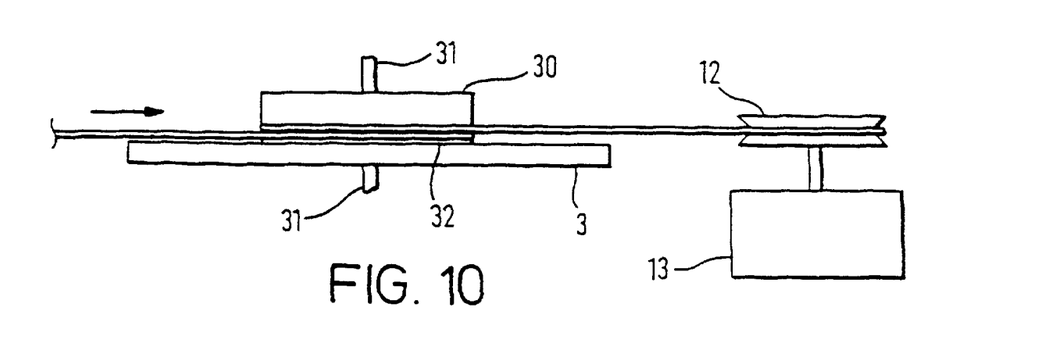
FIG. 10 is a sectional view of the device shown in FIG. 9.

Another example of the invention is shown in FIGS. 9 and 10, which can be considered as a modification of the embodiment shown in FIGS. 1 and 2. Referring to FIGS. 9 and 10, the rotary disc 3 is provided with a phase mask 2 in the manner previously described. A capstan 30 is attached to the disc 3 and the arrangement is mounted for rotation about a shaft 31. A circular groove 32 is formed around the base of the capstan 30, which receives the optical fibre 1. As shown in FIG. 9, the optical fibre is wrapped around the capstan 30 in the groove 32, and leads out of the groove to pulley 12 driven by motor 13. The shaft 31 is not driven. On operation of the motor 13, the pulley 12 drives the fibre 1 which causes the capstan 30 to be rotated together with the disc 3. Thus, the fibre is moved in a circular path by rotation of the capstan 30 in synchronism with the phase mask 2, so that exposure of the fibre can be carried out as described previously with reference to FIG. 1. The advantage of the arrangement as compared with FIG. 1 is that the fibre 1 and the phase mask 2 are held in strict synchronism during the exposure process.

The described devices have the advantage that fibres can be written with a grating having a length of one meter or more, which results in a refractive index grating with an ultra-narrow bandwidth or with a particular chirp.

Also, the phase mask pattern can be prepared in a number of different ways. For example, the pattern could be formed holographically in a thick photographic film, which could be in the form of a long belt which is run in synchronism through a pattern recording point where it is illuminated with laser radiation. The pattern need not necessarily be a holographic pattern but could be produced by a shadow mask. Many other modifications and variations will be apparent to those skilled in the art, falling within the scope of the claims hereinafter.

What is claimed is:

1. A device for recording a refractive index pattern in a photosensitive optical fibre, comprising:

means for producing a moving optical intensity pattern that includes a rotatable phase mask, means for feeding the optical fiber along a path past the rotatable phase mask during production of the moving pattern so as to record the pattern in the optical fibre using a continuous exposure process where the optical fibre and the rotatable phase mask move at the same rate;

a source of optical radiation for illuminating the rotatable phase mask; and wherein the rotatable phase mask comprises a disc mounted for rotation about its axis with the phase mask disposed in a circular loop around the axis.

2. A device as in claim 1 wherein the phase mask includes a series of mask elements extending radially outwardly of the disc axis, disposed in separate loops around the axis.

3. A device as in claim 1 including means for adjusting the radial distance between the fed fibre and the axis of the disc to adjust the spatial periodicity of the recorded pattern.

4. A device for recording a refractive index pattern in a photosensitive optical fibre said device comprising:

means arranged in a loop for producing a moving optical intensity pattern including a rotatable phase mask, means for exposing the optical fibre to the pattern so as to record it linearly in the optical fibre using a continuous exposure process where the optical fibre and the mask move at the same rate; and wherein the optical fibre into which the pattern is to be recorded is wound a plurality of times around the loop.

5. A device for recording a refractive index pattern in a photosensitive optical medium which undergoes a change in refractive index in response to exposure to light and having an elongate optical fibre or optical waveguide path already formed in the medium, said device including:

a light source to produce an optical beam, means to receive the elongated previously formed photosensitive optical medium, and interference pattern forming means including a mask pattern to be recorded in said medium, wherein said interference pattern forming means is arranged to receive said optical beam and generate therefrom a recordable optical interference pattern to be recorded in said photosensitive medium as a refractive index pattern, and wherein said interference pattern forming means includes a support having substantially circular symmetry and an axis around which said mask pattern is disposed, so that, in use, said mask pattern is recorded a plurality of times along said elongated previously formed optical path.

6. A device as in claim 5 wherein said interference pattern forming means includes a phase mask.

7. A device as in claim 5 wherein the circularly symmetric support member is hollow and the optical radiation source is configured so that radiation therefrom is directed through the body from within so as to form said optical pattern exteriorly thereof.

8. A device as in claim 7 wherein the circularly symmetric support member comprises is cylindrical.

9. A device as in claim 5 wherein the circularly symmetric support member comprises a generally planar structure.

10. A device as in claim 9 wherein the circularly symmetric support member comprises a disc.

11. A device as in claim 10 including control means for controlling the relative rate of the pattern movement produced by the drive means and the rate of feed produced by the feeding means whereby to control characteristics of the pattern recorded in the optical medium.

12. A device for recording a refractive index pattern in a photosensitive optical medium of an optical fibre or optical waveguide already formed in the medium and which undergoes a change in refractive index in response to exposure to light, said device including:
a pattern recording location to receive a sample of said elongated previously formed photosensitive optical medium,
an optical source for producing an optical beam,
an interference pattern forming means including a mask pattern to be recorded in said medium, disposed to receive said optical beam, for producing a recordable optical interference pattern from said received optical beam to be recorded in said elongated previously formed photosensitive medium as a refractive index pattern at said location,
wherein said mask pattern is disposed around an axis on a circular or cylindrical support, and
rotating means for allowing rotation of said mask pattern around said axis, so as to permit said pattern to be rotated a plurality of times through said location to be recorded a plurality of times in said elongated previously formed optical waveguide or optical fibre medium at said location.

13. A device as in claim 12 further including means for moving said optical medium through said recording location.

14. A device as in claim 13 wherein said interference pattern forming means includes a phase mask.

15. A device as in claim 13 including a motor to rotate the circular or cylindrical support about the axis so as to produce a moving optical intensity pattern, and means for feeding the optical medium along a path past the rotating member during production of the moving pattern so as to record the pattern in the medium.

16. A device as in claim 15 wherein the motor is coupled to the axis of rotation of the support member.

17. A device as in claim 15 wherein the feeding means is configured to feed a photosensitive optical fibre past the rotary support member.

18. A device as in claim 17 including means for adjusting the radial distance between the fed fibre and the axis of the rotary support member whereby to adjust the spatial periodicity of the recorded pattern.

19. A device as in claim 12 wherein said interference pattern forming means includes a phase mask.

20. A device as in claim 12 wherein the circular or cylindrical support member comprises a body of silica and the phase mask comprises spatially periodic undulations formed in the surface thereof.

21. A device as in claim 20 wherein the surface undulations have been formed by lithography and selective etching.

22. A device for recording a refractive index pattern in a photosensitive optical medium which undergoes a change in refractive index in response to exposure to light and having a previously formed elongate optical fibre or waveguide path, said device including:
a plurality of recording locations to receive a sample of said previously formed elongate photosensitive optical medium fibre or waveguide,
an optical source for producing an optical beam,
an interference pattern forming means including a mask pattern to be recorded in said previously formed optical fibre or waveguide medium, disposed to receive said optical beam, for producing a recordable optical interference pattern from said received optical beam to be recorded in said elongated photosensitive medium as a refractive index pattern at said plurality of recording locations,
wherein said mask pattern is disposed on a substantially cylindrical support,
wherein said plurality of recording locations are disposed on said support, said support being configured to permit said elongated optical medium to be wound around said support a plurality of turns of said optical medium to be supported thereon, and
wherein each of said plurality of recording locations receives a respective one of said turns, to permit said mask pattern to be recorded a plurality of times in said medium.

23. A device as in claim 22 including further recording locations disposed on said support around said axis, further including means for scanning said optical beam around said axis, so as to enable refractive index patterns to be recorded at said locations disposed around said axis.

24. A device as in claim 23 wherein said interference pattern forming means includes a phase mask.

25. A device as in claim 22 wherein said interference pattern forming means includes a phase mask.

26. A device as in claim 22 and including photosensitive optical medium with an elongate optical path arranged in a circular coil configuration coaxial with the pattern on the cylindrical support member.

27. A device as in claim 26 wherein the optical medium comprises a planar substrate with the optical path arranged in the substrate in a spiral pattern generally coaxial with the pattern on the support member.

28. A device for recording a refractive index pattern in a photosensitive optical medium which undergoes a change in refractive index in response to exposure to light and having a previously formed elongate optical fibre or optical waveguide path, said device including:
a plurality of recording locations to receive a sample of said previously formed elongate photosensitive optical fibre or optical waveguide medium,
an optical source for producing an optical beam,
an interference pattern forming means including a mask pattern to be recorded in said previously formed elongate medium, disposed to receive said optical beam, for producing a recordable optical interference pattern from said received optical beam to be recorded in said photosensitive medium as a refractive index pattern at said plurality of recording locations,
wherein said mask pattern is disposed on a substantially cylindrical support having a longitudinal axis around which it is disposed, and
wherein said plurality of recording locations are disposed on said support around said axis,
said device further including scanning means for scanning said optical beam around said axis, so as to enable refractive index patterns to be recorded at said locations disposed around said axis.

29. A device as in claim 28 wherein said interference pattern forming means includes a phase mask.

30. A method of recording a refractive index pattern in a photosensitive optical medium, said optical medium which undergoes a change in refractive index in response to exposure to light and including a previously formed optical fibre or optical waveguide path, the method comprising:

disposing a sample of said previously formed photosensitive optical fibre or optical waveguide medium at a recording location, generating from a mask pattern an interference pattern to be recorded in said previously formed optical fibre or optical waveguide medium as a refractive index pattern at said recording location, and disposing said mask pattern on a support having substantially circular symmetry and an axis around which said mask pattern is disposed, so that said mask pattern is recorded a plurality of times along said optical path.

31. A method as in claim 30 including apprising the resultant pattern at opposite ends by asymmetrically stretching the optical medium during recording of the component patterns which form opposite ends of the resultant pattern.

* * * * *